United States Patent Office 3,549,579
Patented Dec. 22, 1970

3,549,579
METHOD OF MAKING CATIONIC LATICES AND THE PRODUCTS THEREOF
Edward A. Sinclair, Kent, Ohio, assignor to The Goodyear Tire & Rubber Company, Akron, Ohio, a corporation of Ohio
No Drawing. Filed Dec. 23, 1965, Ser. No. 516,122
Int. Cl. C08d 7/10, 7/18
U.S. Cl. 260—29.7
6 Claims

ABSTRACT OF THE DISCLOSURE

A method for converting an anionic latex into a cationic latex by treating the anionic latex with one to about 10 percent by weight of an emulsion conversion agent from the class of alkyl ammonium salts and the salts of alkylene diamine having at least one alkyl radical for each amine nitrogen, and treating to adjust the pH to at least 7.

---

The present invention relates to a method of converting anionic latices into cationic latices and their use with cationic bituminous emulsion.

The synthetic rubber industry has found it convenient to polymerize olefinic monomers to produce anionic latices. Also, when it was attempted to polymerize olefinic monomers in a cationic system, it was found that the resulting cationic latices are inferior as agents for rubberizing bituminous materials relative to cationic latices produced from the anionic latices.

It has been discovered that an anionic latex may be converted to a cationic latex by treating the anionic latex with an emulsion conversion agent selected from the class of an alkyl quaternary amine salt or an alkyl ammonium salt or a salt of alkylene diamine of the secondary type or the mixed primary-secondary type with the salt being preferably of the anions selected from halide, sulfate and nitrate and then treating with an acid to make the latex acidic, preferably to a pH of about 6 and down to as low as about 4 or 3.

Representative examples of the anionic latices useful in making this invention are the polymers and copolymers produced with an anionic emulsion system from the representative olefins such as butadiene, isoprene, styrene, vinyl pyridine, acrylic acid, methacrylic acid and the alkyl esters of these two acids, acrylonitrile, vinyl chloride, as well as the natural latices such as natural rubber.

The emulsion conversion agents useful in this invention may be grouped as alkyl quaternary amine salts, alkyl ammonium salt, salt of an alkylene diamine of the secondary type or the mixed primary-secondary type. The alkyl group in these compounds may have from 10 to about 20 carbon atoms with those from 12 to 18 carbon atoms being preferred. The alkylene radical may contain from 2 to 10 carbon atoms.

Representative members of these are the alkyl pyridinium chlorides with the alkyl group being preferably lauryl or oleyl, N,N'-dialkyl propylene diamine hydrochlorides where the alkyl radical is preferably lauryl, oleyl and stearyl, and the N-alkyl propylene diamine hydrochloride or nitrate where the alkyl radical is preferably lauryl, oleyl or stearyl. These salts may be formed by reacting the basic nitrogen containing compound with an anion, preferably one which is monovalent. Although higher valent anions may be used, as a practical matter those having a valency of more than two would not be used in most commercial operations. Representative of these anions are the halides, such as chloride, bromide, iodide and fluoride, nitrates, nitrites, sulfates, sulfites, acetate, formate and related anions of the lower organic acids.

The amount of emulsion conversion agent used should be at least 1% by weight and sufficient at the pH of the anionic latex to prevent coagulation upon adjusting the pH to less than 7 but no more than about 10%.

The acids useful in adjusting the pH of the latices are mineral or organic with sulfuric, hydrochloric and acetic being preferred.

EXAMPLE I

A hundred parts of an anionic latex (69.5% solids) of a copolymer of butadiene-styrene (70/30% by weight) had 9 parts of a 33⅓% aqueous solution of lauryl pyridinium chloride added thereto and incorporated therein by stirring. Then 2.25 parts of a 1.7 N acetic acid solution was added and incorporated therein to give a stable cationic latex having a pH of about 5.9, 2% gel and 62.4% solids.

EXAMPLE II

Three percent by weight of the cationic latex of Example I was added to 100 parts of a cationic asphalt emulsion and thoroughly mixed to give a rubberized cationic asphaltic emulsion. The test results on residue by evaporation from the rubberized and unrubberized latices are shown in Table 1:

TABLE 1

| Latex | Cationic asphalt | Rubberized cationic asphalt |
|---|---|---|
| Residue by evaporation, percent | 74.1 | 74.0 |
| Penetration at 77° F | 153 | 121 |
| Penetration at 32° F | 42 | 36 |
| Toughness, inch-pounds | 13 | 33 |
| Ductility at 77° F | 150 | 150+ |
| Ductility at 39.2° F. (5 cm./min.) | 39 | 150+ |
| Softening point (R and B)° F | 99 | 126 |

EXAMPLE III

|  | Cationic latices prepared from anionic latex | | | | |
|---|---|---|---|---|---|
| Latex [1] | 100 | 100 | 100 | 100 | 100 |
| Stearyl propylene diamine chloride (50% strength) | 6 | | | | 6 |
| Ditallow-propylene diamine chloride | | 6 | 3 | 4 | |
| Water | 2 | 9 | | | |
| 1 N HCl | 7 | 13 | 11 | 12 | 5 |
|  | 115 | 128 | 114 | 116 | 111 |
| pH | 6.1 | 6.5 | 6.3 | 6.1 | 5.9 |
| Remarks | (2) | (3) | (4) | (5) | (6) |

[1] 70/30 butadiene-styrene made with a fatty acid and having a solids content of 69%.
[2] Very viscous solid cream in 10 days.
[3] Very viscous until H₂O added. Stable.
[4] Fine coagulum.
[5] Very viscous until acid added. Stable.
[6] Solid cream on top in 7 days.

It should be noted that some mixed primary-secondary diamine salts have a tendency to produce creaming on standing even when used at 3% active ingredients by weight whereas the salts of the di-secondary diamines exhibit this tendency only when used in relatively small amounts.

While certain representative embodiments and details have been shown for the purpose of illustrating the invention, it will be apparent to those skilled in this art that various changes and modifications may be made therein without departing from the spirit or scope of the invention.

What is claimed is:
1. A method for converting an anionic latex of polymer into a cationic latex consisting essentially of treating the anionic latex with at least about one percent and a sufficient amount of an emulsion conversion agent to prevent coagulation of the latex when its pH is adjusted to less than 7 but no more than about 10 percent by weight, said emulsion conversion agent being selected from the class consisting of the salt of a quaternary alkyl ammonium compound and the salts of an alkylene diamine having one or two alkyl radicals for each amine nitrogen, said alkyl radical containing 10 to 20 carbon atoms and the alkylene radical containing 2 to 10 carbon atoms, and then treating with sufficient acid to lower the pH to at least 7.

2. The method of claim 1 wherein the salt is composed of a monovalent anion.

3. The method of claim 1 wherein the emulsion conversion agent is an alkyl pyridinium salt.

4. The method of claim 1 wherein the alkylene radical of the diamine has 3 carbon atoms.

5. The method of claim 1 wherein the emulsion conversion agent is added to the anionic latex.

6. The method of claim 1 wherein the anionic latex is a copolymer of butadiene-styrene and contains a solid content of approximately 69 percent by weight.

References Cited
UNITED STATES PATENTS

| | | | |
|---|---|---|---|
| 2,912,350 | 11/1959 | Videen et al. | 260—29.6(EMN) |
| 2,973,285 | 2/1961 | Berke et al. | 260—29.6EMN |
| 3,205,187 | 8/1965 | Vandehoff | 260—29.7 |

MURRAY TILLMAN, Primary Examiner

W. J. BRIGGS, SR., Assistant Examiner

U.S. Cl. X.R.

260—28.5, 29.6